(12) United States Patent
Heuft et al.

(10) Patent No.: US 11,305,939 B2
(45) Date of Patent: Apr. 19, 2022

(54) DEVICE FOR TRANSPORTING STANDING CONTAINERS BETWEEN CLAMPING BELTS

(71) Applicant: HEUFT SYSTEMTECHNIK GMBH, Burgbrohl (DE)

(72) Inventors: Bernhard Heuft, Burgbrohl (DE); Olga Kasdorf, Warburg (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 17/277,168

(22) PCT Filed: Oct. 18, 2019

(86) PCT No.: PCT/EP2019/078407
§ 371 (c)(1),
(2) Date: Mar. 17, 2021

(87) PCT Pub. No.: WO2020/079242
PCT Pub. Date: Apr. 23, 2020

(65) Prior Publication Data
US 2022/0002087 A1 Jan. 6, 2022

(30) Foreign Application Priority Data
Oct. 18, 2018 (DE) .................... 10 2018 008 272.6

(51) Int. Cl.
*B65G 15/14* (2006.01)
*B67B 3/26* (2006.01)
(Continued)

(52) U.S. Cl.
CPC ............. *B65G 15/14* (2013.01); *B65G 15/20* (2013.01); *B65G 47/2445* (2013.01);
(Continued)

(58) Field of Classification Search
CPC ............ B65G 15/14; B65G 2201/0244; B65G 2812/02217; B65G 15/105; B65G 15/12;
(Continued)

(56) References Cited

U.S. PATENT DOCUMENTS 3,921,791 A 11/1975 Borfleth et al.
5,853,080 A * 12/1998 Patois .................. B65G 37/005
198/626.1

(Continued)

FOREIGN PATENT DOCUMENTS

DE 22 32 960 A1 1/1974
DE 26 31 643 A1 5/1978
(Continued)

OTHER PUBLICATIONS

International Preliminary Report on Patentability issued in related application PCT/EP2019/078407, with English language translation, dated Apr. 14, 2021, 16 pages.
(Continued)

*Primary Examiner* — Mark A Deuble
(74) *Attorney, Agent, or Firm* — Leydig, Voit & Mayer, Ltd.

(57) ABSTRACT

A transport device for transporting upright containers arranged in a single row, comprising a first clamping belt and a second clamping belt, between which the containers arranged in a single row are held and transported, and at least one first rotary cylinder and one second rotary cylinder, around which the containers held by the clamping belts are transported. The containers and the clamping belts are guided one after the other around the at least two rotary cylinders in such a way that the containers are each pressed against the respective rotary cylinder by the radially outer clamping belt.

15 Claims, 5 Drawing Sheets

(51) Int. Cl.
*B65G 15/20* (2006.01)
*B65G 47/244* (2006.01)

(52) U.S. Cl.
CPC ...... *B67B 3/261* (2013.01); *B65G 2201/0244* (2013.01); *B65G 2812/02217* (2013.01)

(58) Field of Classification Search
CPC .. B65G 15/16; B65G 2201/0247; B67B 3/261
See application file for complete search history.

(56) References Cited

U.S. PATENT DOCUMENTS

| | | | |
|---|---|---|---|
| 5,950,804 | A | 9/1999 | Farkas |
| 6,260,425 | B1 | 7/2001 | Eder |
| 11,117,750 | B2 * | 9/2021 | Heuft ................. B65G 21/2054 |
| 2010/0115888 | A1 | 5/2010 | Bassani et al. |
| 2014/0302236 | A1 * | 10/2014 | Blot ........................ B26D 7/32 |
| | | | 427/207.1 |
| 2016/0355369 | A1 | 12/2016 | Kang et al. |
| 2021/0264351 | A1 * | 8/2021 | Carvallo ............ G06Q 30/0185 |

FOREIGN PATENT DOCUMENTS

| | | |
|---|---|---|
| DE | 297 1 6 795 U1 | 1/1999 |
| EP | 1048594 A2 * | 11/2000 ......... B65G 47/2445 |
| EP | 2 808 275 A1 | 12/2014 |
| WO | 99/23480 A1 | 5/1999 |
| WO | WO-2013167790 A1 * | 11/2013 ............. B65G 47/58 |

OTHER PUBLICATIONS

Search Report issued in related application DE 10 2018 008 272.6, dated May 29, 2019, 7 pages.
Search Report issued in related application PCT/EP2019/078407, dated Jan. 28, 2020, with English language translation, 5 pages.

* cited by examiner

DEVICE FOR TRANSPORTING STANDING CONTAINERS BETWEEN CLAMPING BELTS

CROSS-REFERENCE TO RELATED APPLICATIONS

This application is the U.S. national phase of the International Patent Application No. PCT/EP2019/078407 filed Oct. 18, 2019, which claims the benefit of German Patent Application No. 10 2018 008 272.6 filed Oct. 18, 2018, the entire content of which is incorporated herein by reference.

FIELD

The disclosure relates to a transport device for transporting upright containers arranged in a single row, comprising a first and a second clamping belt between which the containers arranged in a single row are held and transported. The disclosure also relates to a corresponding transport method and to a method for testing the tightness of deformable, filled containers.

BACKGROUND

It is known to arrange a pair of clamping belts opposite each other in a container inspection device and to convey deformable filled containers between the clamping belts. For example, DE 297 16 795 U1 discloses such a belt drive. This belt drive can be used to perform a pressure or tightness test on easily deformable containers. For this purpose, the containers are guided on a conveyor belt and pressurized by the laterally running belts.

In this type of belt drive, the belts are guided over contact strips which are used to generate the required contact pressure on the containers. However, these devices have the disadvantage that there is relatively high friction between the back of the drive belts and the contact strips, which has a negative effect on the service life of the drive belts.

SUMMARY

Disclosed embodiments are based on the task of providing a transport device which has an increased service life compared to conventional transport devices. A further task is also to provide a transport device which can be adapted as easily as possible to different container sizes. A further task is to provide a transport device that has a compact design, but nevertheless covers a transport path that is as long as possible, during which the containers can be subjected to external pressure.

According to the disclosed embodiments, a transport device for transporting upright containers arranged in a single row is proposed. The transport device comprises a first clamping belt and a second clamping belt, between which the containers arranged in a single row are held and transported. The transport device further comprises at least a first and a second rotary cylinder around which the containers held by the clamping belts are transported. The containers and the clamping belts are guided around the rotary cylinders in the circumferential direction in such a way that the containers are pressed against the respective rotary cylinder by the radially outer clamping belt.

In the present transport device, the containers are clamped between both clamping belts and simultaneously pressed against one of both rotary cylinders by the respective radially outer clamping belt. On the one hand, this allows the containers to be transported freely suspended around the rotary cylinders. On the other hand, the clamping belts can be controlled in such a way that they exert a freely selectable, predetermined contact pressure on the transported containers. For this reason, the present transport device is particularly suitable for use in a tightness control of filled deformable containers, such as PET bottles or light metal cans. When leaky containers are subjected to external pressure, the resulting internal pressure is lower than for tight containers, while the measured fill level increases compared to tight containers. In conventional tightness controls, the length of the pressure section is limited due to high friction between clamping bars and clamping belts, as well as due to structural conditions. The present transport device, on the other hand, offers a possibility of constructing pressure sections with less friction and in a more compact way, so that pressure sections with a significantly increased length can be constructed.

According to disclosed embodiments, the pressure on the container wall is generated by pressing the deformable containers against the rotary cylinders due to the belt tension of the clamping belts. At most, this results in rolling friction between the containers and the clamping belts. Further friction of the clamping belts, for example via contact strips and the like, is avoided. As a result, the clamping belts wear less, and the effective service life of the clamping belts and the maintenance intervals of the transport devices can be extended.

Conventional conveyors are advantageously used, with which the containers are conveyed in in upright position and in a single row to the transport device. Conventional conveyor belts or link chain conveyors can be used as conveyors. The containers can be additionally or exclusively conveyed on the conveyor belt by air cushions or rollers. The conveyor belt can also be designed as a fixed plate over which the containers are pushed by back pressure. The containers are preferably conveyed approximately tangentially to the first rotary cylinder.

Preferably, the clamping belts are each guided around at least two deflection rollers which are provided at the infeed area and at the outfeed area of the transport device. The leading strands of both clamping belts run from the respective deflection roller in the infeed area via the at least two rotary cylinders to the respective deflection roller at the outfeed area of the transport device. The returning strand of the clamping belts is returned to the deflection roller of the infeed area via one or more support rollers.

Both deflection rollers at the infeed area of the transport device are arranged on opposite sides of the container stream being conveyed in. Both clamping belts guided over these deflection rollers then pick up the single-row container stream and guide it around the at least two rotary cylinders to the respective deflection rollers at the outfeed area of the transport device. The latter are also arranged on opposite sides of the container stream to be conveyed out.

In a further preferred embodiment, contact strips are arranged in the infeed area of the transport device between the deflection rollers and the first rotary cylinder, between which the clamping belts and the containers are guided through. These contact strips are provided on both sides of the conveyor conveying in and are used to exert pressure on the container walls even before the containers are guided around the rotary cylinders. In this way, the available space can be better utilized to provide the longest possible pressure section.

In a further preferred embodiment, contact strips are also arranged in the outfeed area of the transport device between the second rotary cylinder and the deflection rollers, between which the clamping belts and the containers are guided through. The pressure section can be extended even further with the contact strips in the outfeed area.

Preferably, the clamping belts are configured to be driveable. Thereby, the speeds of the clamping belts can be set independently of each other.

The drive of the clamping belts can be realized by any motors. Particularly suitable in this context are synchronous motors, preferably permanently excited synchronous motors.

The drives of the clamping belts are preferably arranged in at least one of both deflection rollers or in at least one of the rotary cylinders around which each of the clamping belts is tensioned. Here, too, an external rotor motor can be used as the drive. The external rotor motor can preferably form a deflection roller or a rotary cylinder. Preferably, this increases the space available for the arrangement of an inspection device. The use of external rotor motors integrated in the rotary cylinder or the deflection rollers not only saves space, but also makes the transport device more accessible overall, which facilitates, for example, maintenance and operation of such a transport device.

If only one of the deflection rollers is driven at a time, the drive is preferably arranged in the deflection roller that is located downstream in the transport direction of the containers to be conveyed. This ensures that the leading strand of the associated clamping belt is taut at all times.

Even better control of the belt speeds can be achieved by driving both deflection rollers of the clamping belts each. If there are large gaps between the containers, or if there are no containers on the transport device yet, the clamping belts can come into direct contact with each other, which can cause considerable friction. In these situations, the speeds of the clamping belts can be electronically adjusted to each other in such a way that there is relatively little relative movement and thus at most little friction between the clamping belts.

By varying the drive speeds of the deflection rollers, the belt length of the leading strand of the clamping belts can be temporarily changed. The belt length of the leading strand of a clamping belt is the length of the clamping belt between the infeed area and the outfeed area of the transport device, in which the containers are guided between the clamping belts. The length of the clamping belt required in this area depends on the number of containers currently being conveyed on the transport device and increases with the number of containers currently being conveyed on the transport device.

If in each case the deflection roller at the upstream infeed area of the transport device has a higher circumferential speed for a short time than the associated deflection roller at the downstream outfeed area of the transport device, the belt length of the leading strand is increased and the containers are pressed less strongly against the rotary cylinder. Conversely, the belt length of the leading strand is reduced if the deflection rollers at the infeed area are briefly operated at a lower circumferential speed than the deflection roller at the outfeed area.

In order to return the belt length in the leading strand to the original level, the deflection rollers may then have to be controlled in reverse. In this way, a belt length that has been shortened for a short time can be compensated again.

In addition or as an alternative to a drive via the deflection rollers, at least one of the rotary cylinders can also have a drive. Preferably, a rotary cylinder drives the radially inner clamping belt, i.e. the clamping belt that is in direct contact with the rotary cylinder throughout.

To improve power transmission, the clamping belts and the driven deflection rollers or rotary cylinders respectively can have corresponding profiles.

However, the rotary cylinders can also be designed to rotate freely in each case, so that the clamping belt in contact in each case can roll freely on the rotary cylinder.

Preferably, both rotary cylinders are arranged offset to each other in the horizontal direction and the containers are conveyed on an S-shaped transport path around the two rotary cylinders. The flow of containers gripped by the clamping belts is first guided around the first rotary cylinder. During transport around the first rotary cylinder, the containers are pressed against the first rotary cylinder by the radially outer first clamping belt. The contact pressure is sufficient to hold the containers freely suspended on the first rotary cylinder.

Immediately afterwards, the containers are guided around the second rotary cylinder. During transport around the second rotary cylinder, the containers are pressed against the second rotary cylinder by the second clamping belt, which is now located radially on the outside. In this case, too, the contact pressure between the containers and the rotary cylinder is sufficiently high to hold the containers in a freely suspended position on the second rotary cylinder.

Advantageously, the containers are each guided around both rotary cylinders with a wrap angle of approximately 180°. Depending on the arrangement of the rotary cylinders, however, smaller or larger wrap angles can also be selected. The greater the wrap angle, the longer the dwell time of the containers on the transport device according to the disclosure—at a constant transport speed—and the longer external pressure can be exerted on the container wall. Preferably, the wrap angle can therefore be up to 240°, more preferably about 210°.

To further increase the dwell time of the containers, more than two rotary cylinders can be provided around which the containers are guided. Preferably, even when three or more rotary cylinders are used, the containers are guided around the rotary cylinders in such a way that they are pressed against the respective rotary cylinders alternately by the first and second clamping belts.

To avoid the risk of the containers slipping downwards, the transport path around the rotary cylinders can additionally be provided with a curved conveyor or a curved rail over which the containers are additionally supported.

Since the containers and the clamping belts or the rotary cylinders are spaced apart, friction can be largely avoided. The achievable length of the transport path on which the containers are subjected to external pressure or on which the containers can be inspected can therefore be significantly greater than is previously the case with linear transport devices. The curved transport path also makes the device more compact overall than previously available linear belt conveyors.

On each side of the container stream to be transported, a single or several clamping belts arranged parallel and one above the other can be used. With several clamping belts arranged in parallel, for example two or three, the containers can be transported more stably if necessary.

The opposing clamping belts can each be arranged offset from one another. Advantageously, each clamping belt is then arranged at a different height. This has the particular advantage that even in the case of gaps in the container flow, it can be prevented that two adjacent clamping belts come to rest on each other and produce unnecessary friction.

Particularly when several staggered clamping belts are used, the rotary cylinder can advantageously be constructed from several independently rotatable cylinder discs. In this sandwich-like structure, each cylinder disc can be assigned to one of the clamping belts. In the event of gaps in the container flow, the clamping belts, which are in themselves radially on the outside, then come to rest on the cylinder disc assigned to the respective clamping belt and can roll over this cylinder disc. Because the cylinder discs can be rotated independently of one another, the clamping belts can have different belt speeds without causing additional friction on the rotary cylinder.

One or more of the cylinder discs can be designed to be drivable and can, for example, be provided with its own external rotor motor. In this way, the rotary cylinders can also be used as a drive for the clamping belts when several staggered clamping belts are used.

A radially inner clamping belt is guided directly over the outer circumference of the respective rotary cylinder or the associated cylinder disc. The containers are therefore pressed by the radially outer clamping belt against the radially inner clamping belt and against the rotary cylinder. The radially inner clamping belt thereby prevents direct contact between the containers and the respective rotary cylinder.

The rotary cylinder can also have one or more circumferential grooves, in each of which one of the clamping belts is guided. The grooves form a receptacle for the respective clamping belt and define its vertical position as it rotates around the rotary cylinder. Such grooves can prevent the clamping belts from being pulled downwards at the outer circumference of the rotary cylinder, for example by containers slipping through.

The grooves can thereby have a depth that is less than the thickness of the clamping belts. In this case, the clamping belts are guided in the grooves. However, the upper side of the clamping belts still protrudes from the grooves, so that these also represent the contact surface for the containers in this configuration.

However, the grooves can also have a depth greater than the thickness of the clamping belts. In this case, the clamping belts are then completely accommodated by the grooves. In this configuration, the containers are then pressed directly against the circumferential surface of the rotary cylinder by the outer clamping belts.

In order to be able to control the effective length of the leading strands of the clamping belts as well as the belt tension of the leading strands of the clamping belts, each clamping belt can be provided with a compensation device. The required length of the leading strand of each clamping belt depends on the number of containers currently being transported on the transport device and increases with the number of containers currently being transported on the transport device.

The compensation device may comprise one or more compensation elements arranged within a clamping belt, i.e. within the path described by the circulating clamping belt(s).

The belt length of the leading strand of a clamping belt can be adjusted with the compensation elements depending on the number, shape and/or size of the containers to be transported on the transfer device.

Preferably, each compensation element is configured to contact the returning strand of a clamping belt and to be adjusted against it in a direction facing away from the rotary cylinders.

If the number of containers transported on the transfer device changes, the effective length of the leading strand of the clamping belt can be easily changed via the compensation element.

Preferably, the compensation element comprises an adjusting device with which a support roller can be adjusted against the returning strand of the clamping belt. The adjusting device can be a motor-driven, mechanical, pneumatic or hydraulic adjusting device. A motor-driven adjusting device can in particular comprise an electric linear drive. When using several support rollers, all or any number of the support rollers can be provided with a compensation element.

The compensation device is primarily used to adjust the required length of the leading strand of the clamping belt to the current transport situation on the transfer device. At the same time, however, the compensation device can also be used to adjust the belt tension. This can ensure that the containers are pressed against the rotary cylinder at a predetermined contact pressure at all times and held securely.

The at least one compensation element of the compensation device is preferably adjusted in such a way that the associated support roller is set against the returning strand of the clamping belt with a predetermined pressure. If the required length of the leading strand of the clamping belt changes, then the position of the support roller is moved by the compensation element in such a way that, with constant belt tension, the leading strand is lengthened or shortened accordingly. Depending on the dimensions of the transport device, length changes of up to several decimeters can occur. The one or, if necessary, several compensation elements of the compensation device must therefore be able to handle correspondingly long travel distances and the associated length changes.

By providing the compensation device, the distance between the deflection rollers of the clamping belt can remain unchanged. In addition, a pressure or tightness test can be optimized by the provision of the compensation device, since the pressure exerted on the containers to be transported can be optimally adjusted by setting the tension of the clamping belt.

To prevent the leading strand and the returning strand of the respective clamping belt from rubbing against each other, one or more support elements can be provided over which the returning strand of a clamping belt is guided. This prevents the returning strand of the clamping belt from running against the inner leading strand of the clamping belt or against another element of the transport device, which in turn causes undesirable friction.

These further support elements can in particular be one or more support rollers over which the returning strand of the respective clamping belt is guided. Depending on the length and complexity of the transport path, one or more such support rollers can be provided.

As mentioned above, the one or more support rollers can also be combined with the compensation device and used at the same time to adjust the belt length of the leading strand of the clamping belts.

Preferably, the outer circumference of the rotary cylinders is formed in a uniform circular shape. With the present transport device, a large number of containers can be transported simultaneously at any speed. The transport performance of the transport device can be adapted at any time to the feed rate of the containers to be transported. This is a decisive advantage over conventional circulating conveyors, such as star wheels, where a constant feed rate has always had to be maintained up to now.

Disclosed embodiments also relate to a method of transporting upright containers arranged in a single row, comprising the steps of:

providing a first clamping belt and a second clamping belt between which the containers arranged in a single row are held and transported, providing at least a first rotary cylinder and a second rotary cylinder around which the containers held by the clamping belts are transported in succession, wherein the containers and the clamping belts are guided successively around the at least two rotary cylinders in such a way that the containers are each pressed against the rotary cylinder by the radially outer clamping belt.

The transport device according to an embodiment can be used wherever it is advantageous for containers to be held in free suspension. For example, the transport device can be provided for a container inspection device, in particular for a container bottom inspection. With the transport device, the distance over which the containers are transported in a freely suspended manner can be significantly increased compared to conventional devices.

According to an embodiment, the transport device can be used to particular advantage for testing the tightness of filled deformable containers, such as PET bottles or lightweight metal cans. For this purpose, a precisely meterable pressure is applied to the containers. If the containers are leaking, the resulting internal pressure is lower, while the fill level increases. In order to detect even small leaks, a certain dwell time of the containers in the pressure device must be ensured. With the transport device, on the one hand the pressure exerted on the individual containers by means of the clamping belts can be precisely adjusted and, on the other hand, the dwell time of the containers in the pressure device can be significantly increased compared to conventional devices.

At the end of the transport device, a conventional inspection device can be provided, with which the internal container pressure and/or the filling level of the containers can be checked in order to make a statement about the tightness of the containers.

The fact that the containers are conveyed almost friction-free in the transport device according to an embodiment means that the transport path and thus the dwell time of the containers in the pressure device can be significantly increased compared to conventional systems. Through the size and number of the rotary cylinders and clamping belts used, the length of the dwell time and the pressure exerted on the containers can be optimally adapted to the respective transport conditions.

A further possible application of an embodiment is in closure control, or more precisely in controlling the required opening and/or closing force of screw closures of closed containers. Such a control is necessary if it is to be checked whether the screw caps of the filled containers can be opened with a desired opening force or whether screw caps are screwed tightly enough.

To determine the required opening or closing force of the screw caps, the containers are conveyed on the transport device and held there frictionally on both sides by the clamping belts. The containers to be inspected are then guided through an opening/closing device, which essentially consists of a pair of belts arranged opposite each other (referred to below as opening belts). These opening belts are mounted at the height of the screw caps of the containers to be inspected and are arranged in such a way that the container closures are guided between the two opening belts by frictional engagement. By means of an adjusting device, the distance between the opening belts can be changed so that the contact pressure and thus the friction between the opening belts and the container closures can be varied.

By specifically controlling the speeds of the opening belts in relation to the transport speed of the containers, the opening belts can be used to twist the screw cap relative to the container.

Preferably, the screw caps are only opened or closed to such an extent that the seal of the containers is maintained and that the freshness seal in particular remains intact. To check whether the required opening or closing force of the screw caps of the containers is within a specified range, it is therefore usually sufficient to turn the screw cap through an angle of rotation of no more than 30°, preferably no more than 20° or 10°.

The force required to open or close the container closures can be determined using a suitable measuring device. The required opening force can be determined, for example, via the current consumption of the drives.

After the container closure check, the container closures can be turned back to the original or another desired position. A second set of opening belts can be provided for this purpose, for example.

The opening/closing device is advantageously dimensioned so that only one container closure at a time is gripped by the opening/closing device. Since the containers can be transported on the transport device in a single row and without spacing between them, the length of the opening/closing device should therefore be smaller than the diameter of the containers to be transported.

Preferably, according to an embodiment, the opening/closing device is arranged in an area of the transport device in which the containers are transported in a straight line. In such a case, the opening belts can also be designed in a straight line. If the opening/closing device is arranged in an area of the transport device in which the containers are transported on a circular path, the circular transport path can be compensated by means of spring force. For this purpose, either the belts themselves can be sufficiently elastic, or the belts can be spring-mounted.

In order to be able to test closures of containers of different sizes, the opening belts can preferably be designed so that they can be moved vertically and horizontally.

Preferably, the opening belts can be automatically moved into the required position according to the dimensions of the containers to be inspected.

BRIEF DESCRIPTION OF THE DRAWINGS

Various embodiments are illustrated in the drawings, in which.

DETAILED DESCRIPTION

Figure 1:
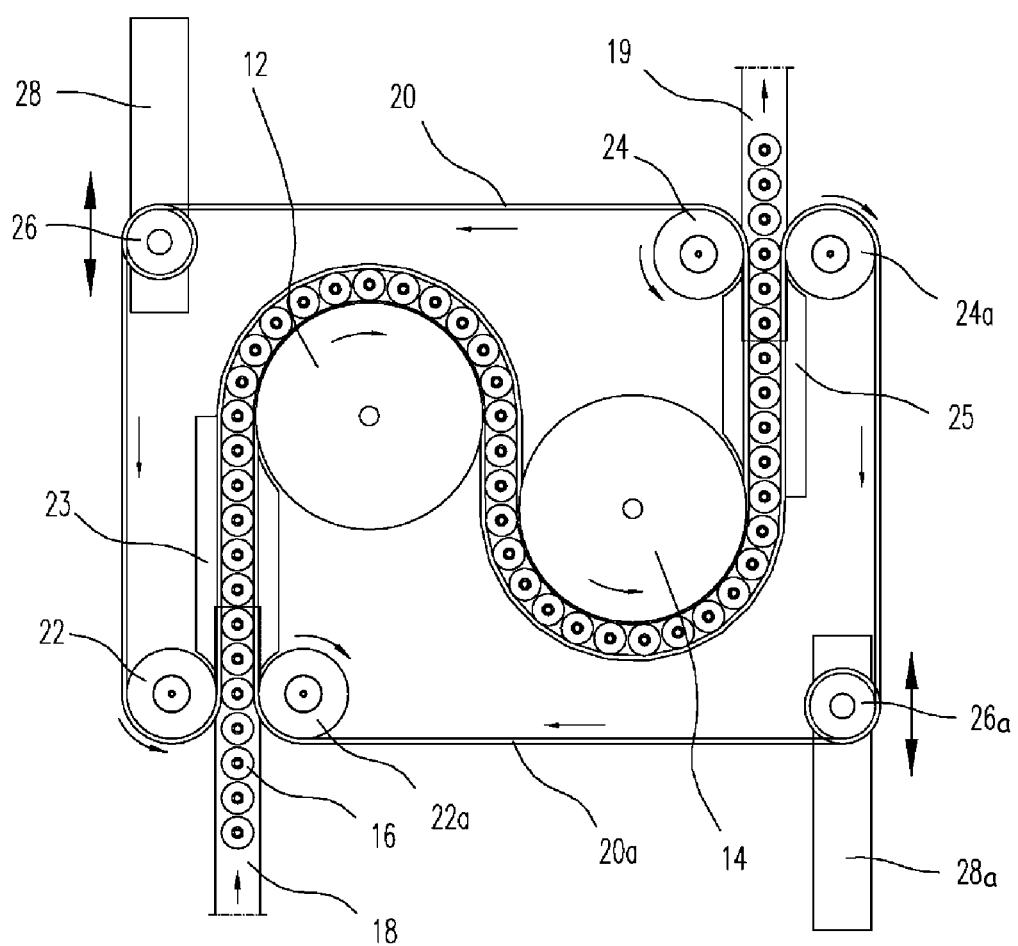
FIG. 1 is a schematic top view of a transport device according to an embodiment.

FIG. 1 shows an embodiment of the transport device 10, according to an embodiment, with a first rotary cylinder 12 and a second rotary cylinder 14 arranged horizontally offset thereto. A first clamping belt 20 and a second clamping belt 20a, are tensioned in an S-shape around both rotary cylinders 12, 14 and thereby describe a transport path for the containers 16 to be transported.

The first clamping belt 20 is guided over two driven deflection rollers 22, 24 and a support roller 26. The second clamping belt 20a is guided over two driven deflection rollers 22a, 24a and also over a support roller 26a.

Both deflection rollers 22, 22a are arranged at the infeed area of the transport device 10 on opposite sides of the container stream being conveyed in. The two deflection rollers 24, 24a, on the other hand, are also arranged at the outfeed area of the transport device 10 on opposite sides of the container stream to be conveyed out.

The first clamping belt 20 is tensioned in an S-shape around the two rotary cylinders 12, 14, starting from the deflection roller 22, and returned to the deflection roller 22 via the deflection roller 24 and the support roller 26.

The area of the clamping belt 20 between the deflection rollers 22 and 24, i.e. the area in which the clamping belt comes into contact with the containers, is referred to as the leading strand of the clamping belt. The area of the first clamping belt between the deflection roller 24 and the deflection roller 22, i.e. the area that is guided over the support roller 26, is referred to as the returning strand of the clamping belt 20.

In the same way, the second clamping belt 20a is tensioned in an S-shape around both rotary cylinders 12, 14, starting from the deflection roller 22a, and returned to the deflection roller 22a via the deflection roller 24a and the support roller 26a.

In the area of the first rotary cylinder 12, the first clamping belt 20 runs radially outward with respect to the second clamping belt 20a. In the area of the second rotary cylinder 14, however, the first clamping belt 20 runs radially inward with respect to the second clamping belt 20a. As a result, the containers 16 are first pressed against the first rotary cylinder 12 by the first clamping belt 20 and then pressed against the second rotary cylinder 14 by the second clamping belt 20a.

In order to adjust the effective length of the leading strand and the belt tension of the clamping belts 20, 20a, the support rollers 26, 26a in the returning strand are each additionally provided with a compensation element 28, 28a.

In FIG. 1, a continuous single-row container stream is conveyed by a conventional conveyor 18. This conveyor 18 guides the container stream between the deflection rollers 22, 22a to the first rotary cylinder 12. From the deflection rollers 22, 22a onward, the containers 16 are then also held laterally by the clamping belts 20, 20a. Between the deflection rollers 22, 22a and the first rotary cylinder 12, the clamping belts 20, 20a and the containers 16 are guided through two contact strips 23 arranged at the side of the transport path. These contact strips 23 press the clamping belts 20, 20a against the outer walls of the containers 16, so that this area of the device is also already used as part of the pressure device.

The container flow gripped by the clamping belts 20, 20a is then guided around the first rotary cylinder 12. During transport around the first rotary cylinder 12, the containers 16 are pressed against the first rotary cylinder 12 by the radially outer first clamping belt 20. The contact pressure is sufficient to hold the containers 16 freely suspended on the rotary cylinder 12.

Immediately afterwards, the containers 16 are guided around the second rotary cylinder 14. During transport around the second rotary cylinder 14, the containers 16 are pressed against the second rotary cylinder 14 by the second clamping belt 20a, which is now located radially on the outside. In this case, too, the contact pressure between the containers 16 and the rotary cylinder 14 is sufficiently high to hold the containers 16 in a freely suspended manner against the rotary cylinder 14. The containers 16 are then set down again on a conventional conveyor 19 and transported further in the direction of the deflection rollers 24, 24a. Between the second rotary cylinder 14 and the deflection rollers 24, 24a, the clamping belts 20, 20a and the containers 16 are guided in turn through two contact strips 25 arranged at the side of the transport path. The clamping belts 20, 20a are also pressed against the outer walls of the containers 16 by these contact strips 25, so that this area of the device is again used to exert pressure on the containers 16.

To avoid the risk of the containers 16 slipping through, a curved conveyor or curved guide plate can also be provided, via which the containers 16 are additionally supported.

Since the containers 16 and the clamping belts 20, 20a each roll off one another, friction can be largely avoided. The achievable length of the transport path over which the containers 16 are subjected to external pressure can therefore be significantly increased compared to previous linear transport systems.

In the area of the exit of the transport device 10, a conventional inspection device (not shown) can be provided, with which the internal container pressure and or the filling level of the containers 16 can be inspected.

Figure 2A:
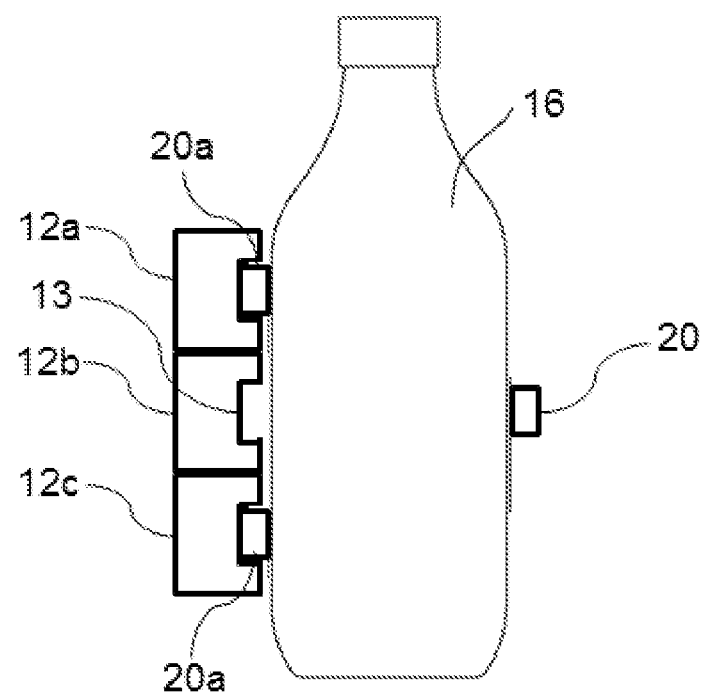
FIG. 2A is a cross-sectional view of a container that is guided between three clamping belts around a segmented rotary cylinder.
Figure 2B:
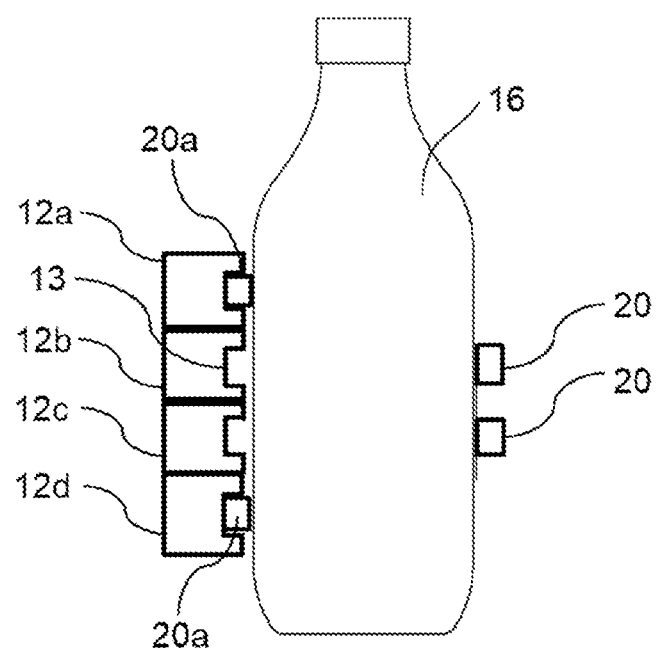
FIG. 2B illustrates a segmented rotary cylinder with a total of four segments allowing for two clamping belts at either side of the containers.

FIG. 2A shows a cross-sectional view of a container in the area of a first rotary cylinder 12 in a modified embodiment. In contrast to the embodiment according to FIG. 1, the containers 16 in the embodiment according to FIG. 2A are guided between a total of three vertically offset clamping belts 20, 20a.

The rotary cylinder 12 is thereby segmented and has three cylinder discs 12a, 12b, 12c, each of which is provided on the circumference with a groove 13 for receiving one of the three clamping belts 20, 20a. The three cylinder discs 12a, 12b, 12c are freely rotatable about a common axis of rotation.

The depth of the grooves 13 is in each case less than the thickness of the clamping belts 20, 20a, so-that the upper side of the clamping belts 20a protrude beyond the circumference of the cylinder discs 12a, 12b, 12c and form a contact surface for the containers 16. The radially outer clamping belt 20 presses the containers 16 against the clamping belts 20a and against the cylinder discs 12a, 12b, 12c. The grooves 13 serve in particular to guide the clamping belts 20a so that they are always guided around the rotary cylinder 12 at the specified vertical height.

If there is a gap in the container flow, the radially outer clamping belt 20 also comes into contact with the rotary cylinder 12. The clamping belt is then received in the groove 13 of the central cylinder disc 12b. Since the cylinder disc 12b is mounted so that it can rotate freely relative to the cylinder discs 12a, 12c, there is no unnecessary additional friction between the rotary cylinder 12 and the clamping belt 20 even if the clamping belts 20 and 20a have different speeds.

The transport device can also be designed with additional clamping belts and a correspondingly more segmented rotary cylinder. The individual cylinder discs can also have their own drives with which the clamping belts can be driven.

Figure 3:
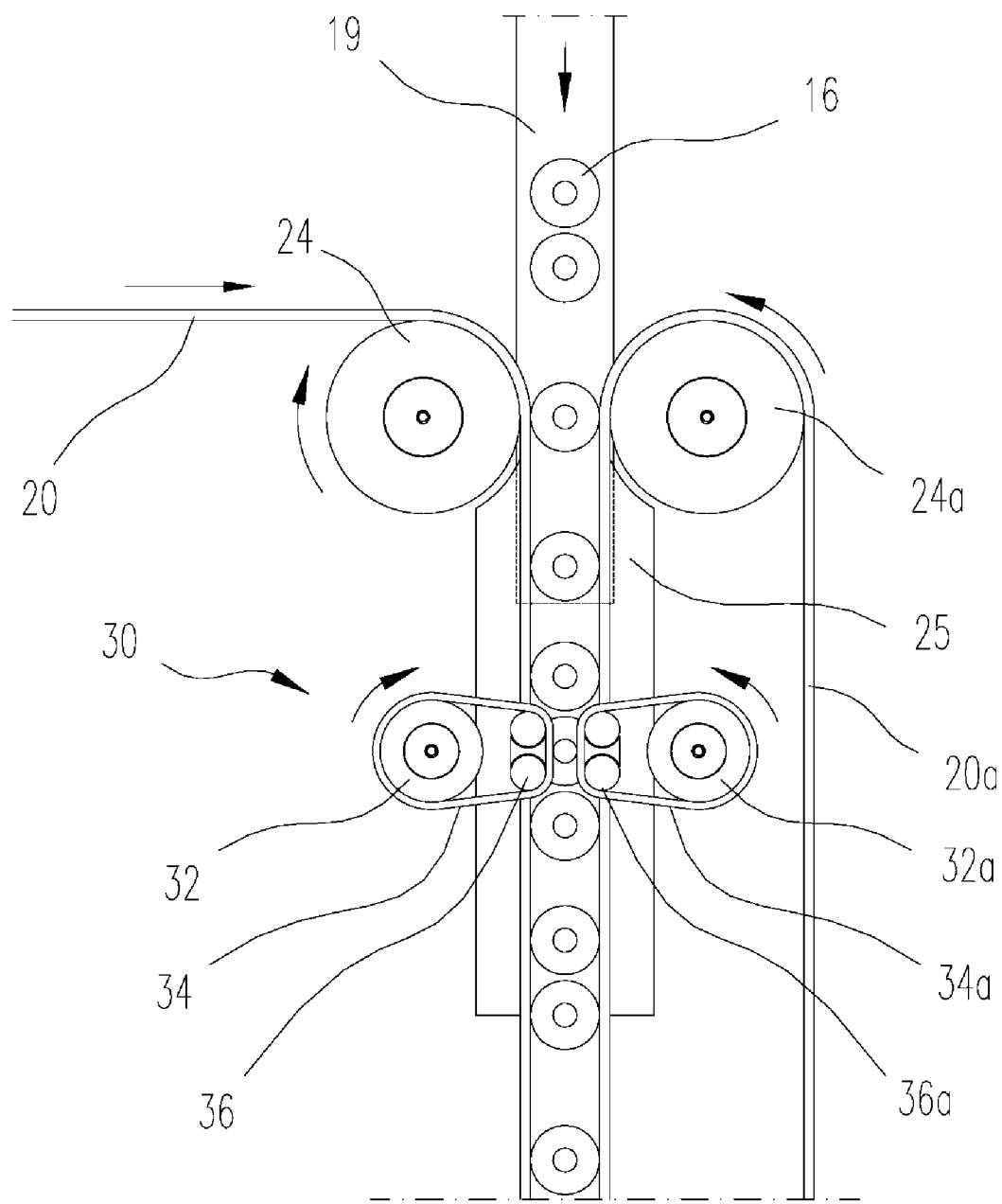
FIG. 3 is a transport device according to an embodiment with an opening/closing device.
Figure 4:
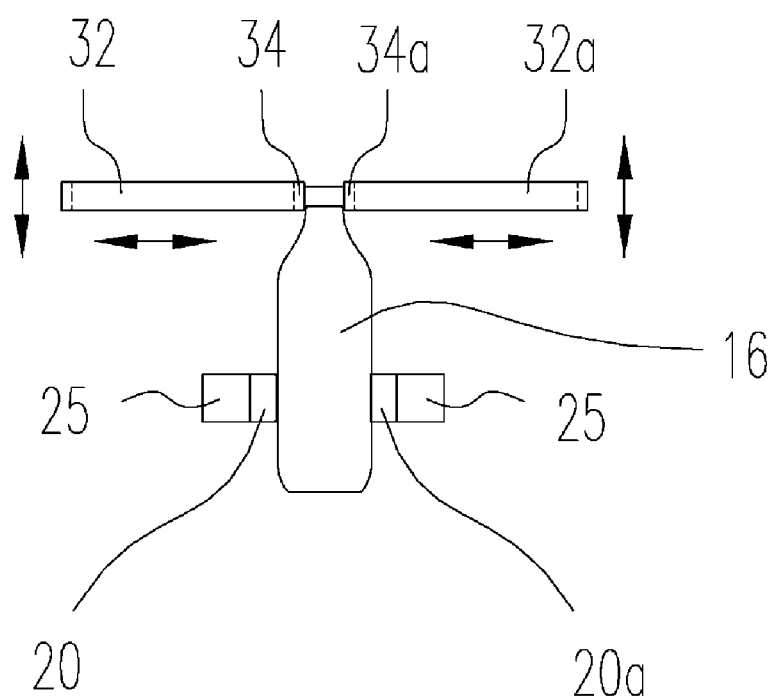
FIG. 4 is a side view of a container in the area of the opening/closing device.

According to an embodiment, one possible application is shown in FIGS. 3 and 4. Here, a closure check is carried out to determine how great the force required to open or close individual container closures is.

For this purpose, an opening/closing device 30 is provided, which essentially consists of a pair of opening belts 34, 34a arranged opposite each other. The opening belts 34, 34a are each driven by rollers 32, 32a and guided parallel to the direction of travel of the containers 16 by deflection rollers 36.

The containers are transported between the clamping belts 20, 20a in such a way that the container closures are guided between the two opening belts 34, 34a. The opening belts 34, 34a frictionally engage with the container closures and can open or close them depending on the control.

In the illustrated embodiment, the opening/closing device 30 is arranged in the infeed area of the transport device according to an embodiment. Alternatively or additionally, the opening/closing device 30 can also be arranged in the outfeed area or in an area between the two rotary cylinders 12, 14. In these areas, the containers are transported essentially in a straight line, so that the opening belts 34, 34a can also have a straight course along the transport direction.

In order to be able to adapt the opening/closing device 30 to differently dimensioned containers 16, the opening belts 34, 34a can each be positioned via suitable adjusting elements. This is indicated in FIG. 4 by both bidirectional arrows. In this way, both the vertical and the horizontal position of the opening belts 34, 34a can be changed.

Using the device for horizontal positioning, the distance between the opening belts 34, 34a can be varied on the one hand, but also the contact pressure with which the opening belts 34, 34a are pressed against the container closures on the other hand.

The container closures are opened and closed by moving the opening belts 34, 34a relative to the conveyor belts 20, 20a and the containers 16. To determine the force required for this, a container closure does not have to be completely unscrewed. It is sufficient if a container closure is only twisted by a fraction of a full turn, e.g. by 30°. Ideally, a screw cap is only opened or closed to such an extent that the seal of the container 16 is maintained.

A suitable measuring device can be used to determine the force required to open or close the container closures. The required opening force can be determined, for example, via the current consumption of the drives of the opening bands 34, 34a.

The disclosure is not limited to the embodiments described, but results from a combination of the features described above.

LIST OF REFERENCE NUMBERS

10 Transport device
12 first rotary cylinder
12a,b,c,d cylinder discs
13 groove
14 second rotary cylinder
16 container
18 linear conveyor
19 linear conveyor
20 first clamping belt
20a second clamping belt
22 deflection roller
22a deflection roller
23 contact strips
24 deflection roller
24a deflection roller
25 contact strips
26 support roller
26a support roller
28 compensation element
28a compensation element
30 opening/closing device
32, 32a driven roller
34, 34a opening belt
36 deflection roller

The invention claimed is:

1. A transport device for transporting upright containers arranged in a single row, the transport device comprising:
a first clamping belt and a second clamping belt, between which the containers arranged in a single row are held and transported,
and at least a first rotary cylinder and a second rotary cylinder around which the containers held by the first and the second clamping belts are transported,
wherein the containers and the clamping belts are guided around the at least two rotary cylinders, and the containers are each pressed against the rotary cylinders by a radially outer clamping belt.

2. The transport device according to claim 1, wherein the rotary cylinders and the clamping belts are configured to be drivable independently of one another.

3. The transport device according to claim 1, further comprising:
a first conveyor configured to convey the containers in,
a second conveyor configured to convey the containers out downstream of the rotary cylinders.

4. The transport device according to claim 1, wherein the containers are conveyed in the form of an S-curve around both rotary cylinders.

5. The transport device according to claim 1, wherein the transport path of the containers around the rotary cylinders is such that in each case, in alternating sequence, the first or the second clamping belt is arranged radially outwardly with respect to the container guided around a respective rotary cylinder and presses the containers against the respective rotary cylinder.

6. The transport device according to claim 1, wherein each of the clamping belts extends around at least two deflection rollers.

7. The transport device according to claim 1, wherein both deflection rollers are provided with drives independent of each other.

8. The transport device according to claim 1 with a compensation device comprising a compensation element and a support roller with which a belt length of a leading strand of each clamping belt can be adjusted.

9. The transport device according to claim 1, wherein the rotary cylinders are constructed from a plurality of independently rotatably mounted cylinder discs, which can optionally be equipped with their own drives.

10. The transport device according to claim 1, wherein the containers are held and transported between a plurality of first and second clamping belts which are arranged on both sides of the container flow and vertically offset with respect to each other.

11. A method for checking the tightness of deformable filled containers, wherein the containers are transported on the transport device according to claim 10,
wherein a predetermined pressure is applied to the containers by means of the clamping belts,
wherein the resulting internal pressure and the filling level of the containers are checked by means of corresponding inspection devices.

12. The transport device according to claim 1, further comprising an opening/closing device with which the container closures can be engaged.

13. A method for closure inspection of closed containers, wherein the containers are transported on the transport device according to claim 12,
  wherein the containers are transported between clamping belts such that the container closures engage with an opening/closing device.

14. The method for closure inspection of closed containers according to claim 13, wherein the opening/closing device comprises a pair of oppositely positioned driven opening belts frictionally engaged with the container closures.

15. A method of transporting upright containers arranged in a single row, the method comprising the steps of:
  providing a first clamping belt and a second clamping belt between which the containers arranged in a single row are held and transported,
  providing at least a first and a second rotary cylinder around which the containers held by the clamping belts are transported,
  wherein the containers and the first and second clamping belts are guided around the rotary cylinders, and the containers are each successively pressed against the rotary cylinders by a radially outer clamping belt.

\* \* \* \* \*